(12) United States Patent
Heo et al.

(10) Patent No.: US 8,797,677 B2
(45) Date of Patent: Aug. 5, 2014

(54) DISK DEFLECTION DAMPER FOR DISK DRIVE

(75) Inventors: Baekho Heo, San Jose, CA (US); Enoch Mylabathula, San Jose, CA (US); Brian P. Schott, San Jose, CA (US); Keith R. Berding, San Jose, CA (US); Jonathan M. Garbarino, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 88 days.

(21) Appl. No.: 13/327,267

(22) Filed: Dec. 15, 2011

(65) Prior Publication Data

US 2013/0155546 A1 Jun. 20, 2013

(51) Int. Cl.
*G11B 33/14* (2006.01)

(52) U.S. Cl.
USPC .......................................................... 360/97.2

(58) Field of Classification Search
CPC .... G11B 33/08; G11B 25/043; G11B 33/128; G11B 19/2009; G11B 19/2036; G11B 33/148; G11B 5/012; G11B 5/4833; G11B 5/6005; G11B 21/12; G11B 21/22
USPC ........................ 360/97.2, 97.19, 99.16, 97.12
See application file for complete search history.

(56) References Cited

U.S. PATENT DOCUMENTS

| | | | |
|---|---|---|---|
| 4,939,611 A | 7/1990 | Connolly | |
| 5,231,549 A | 7/1993 | Morehouse et al. | |
| 5,239,431 A | 8/1993 | Day et al. | |
| 5,453,889 A | 9/1995 | Alt | |
| 5,541,791 A * | 7/1996 | Yamasaki et al. | 360/256.1 |
| 5,625,514 A | 4/1997 | Kubo et al. | |
| 5,640,290 A * | 6/1997 | Khanna et al. | 360/99.16 |
| 5,757,587 A * | 5/1998 | Berg et al. | 360/254.7 |
| 5,801,899 A | 9/1998 | Genheimer | |
| 5,864,444 A | 1/1999 | Baker et al. | |
| 5,903,409 A | 5/1999 | Allen et al. | |
| 5,959,807 A | 9/1999 | Jurgenson | |
| 6,055,134 A * | 4/2000 | Boutaghou | 360/254.4 |
| 6,084,744 A | 7/2000 | Genheimer et al. | |
| 6,115,214 A | 9/2000 | Allsup et al. | |
| 6,137,658 A | 10/2000 | Matsuzaki et al. | |
| 6,172,843 B1 | 1/2001 | Genheimer et al. | |
| 6,208,484 B1 | 3/2001 | Voights | |
| 6,215,628 B1 | 4/2001 | Boutaghou | |
| 6,226,144 B1 | 5/2001 | Nagl et al. | |
| 6,236,531 B1 * | 5/2001 | Allsup et al. | 360/97.2 |
| 6,271,987 B1 * | 8/2001 | Allsup et al. | 360/97.2 |
| 6,273,823 B1 * | 8/2001 | Rohs et al. | 464/68.3 |

(Continued)

FOREIGN PATENT DOCUMENTS

EP 1615224 B1 9/2009
JP 62088195 A 4/1987

(Continued)

*Primary Examiner* — Brian Miller (57) ABSTRACT

A disk drive including a disk having a bottom surface and a base having a first surface lying along a first plane and a second surface lying along a second plane positioned substantially parallel to the first plane. The second surface is spaced apart from the first surface and is beneath at least a portion of the bottom surface of the disk. A damper of the disk drive is located on the second surface adjacent the first surface and is configured to contact a portion of the bottom surface of the disk when the disk is deflected toward the first surface.

8 Claims, 6 Drawing Sheets

(56) References Cited

U.S. PATENT DOCUMENTS

| | | | |
|---|---|---|---|
| 6,341,051 B2 | 1/2002 | Hachiya et al. | |
| 6,351,344 B1 * | 2/2002 | Krum et al. | 360/99.18 |
| 6,351,350 B1 | 2/2002 | Symons et al. | |
| 6,377,420 B1 * | 4/2002 | Tadepalli et al. | 360/97.19 |
| 6,407,879 B1 * | 6/2002 | Fruge' et al. | 360/99.17 |
| 6,417,986 B1 | 7/2002 | Tran et al. | |
| 6,424,487 B2 * | 7/2002 | Nagl et al. | 360/97.2 |
| 6,452,753 B1 | 9/2002 | Hiller et al. | |
| 6,473,270 B1 | 10/2002 | McDonald et al. | |
| 6,477,000 B1 | 11/2002 | Pottebaum et al. | |
| 6,542,328 B2 * | 4/2003 | Harrison et al. | 360/97.14 |
| 6,556,383 B2 | 4/2003 | Murphy et al. | |
| 6,624,966 B1 | 9/2003 | Ou-Yang et al. | |
| 6,724,566 B2 * | 4/2004 | Kant et al. | 360/99.16 |
| 6,765,762 B2 | 7/2004 | Yanagihara | |
| 6,781,791 B1 | 8/2004 | Griffin et al. | |
| 6,791,790 B2 | 9/2004 | Lee | |
| 6,891,696 B1 * | 5/2005 | Ou-Yang et al. | 360/99.16 |
| 6,894,867 B2 | 5/2005 | Hong et al. | |
| 6,917,491 B2 | 7/2005 | Choi | |
| 6,930,857 B1 | 8/2005 | Lin et al. | |
| 6,961,207 B2 | 11/2005 | Kang et al. | |
| 7,057,849 B2 * | 6/2006 | Soderfelt et al. | 360/97.19 |
| 7,085,098 B1 | 8/2006 | Yang et al. | |
| 7,136,246 B2 | 11/2006 | Khanna et al. | |
| 7,146,713 B1 * | 12/2006 | Ying | 29/603.16 |
| 7,256,959 B2 | 8/2007 | Morioka | |
| 7,274,537 B2 | 9/2007 | Fan et al. | |
| 7,307,811 B2 * | 12/2007 | Xu et al. | 360/97.17 |
| 7,310,199 B2 * | 12/2007 | Pottebaum et al. | 360/97.14 |
| 7,327,530 B2 * | 2/2008 | Lee et al. | 360/97.19 |
| 7,372,662 B2 * | 5/2008 | Xu et al. | 360/97.19 |
| 7,420,775 B2 * | 9/2008 | Lim | 360/97.19 |
| 7,428,741 B2 | 9/2008 | Kim et al. | |
| 7,457,078 B2 | 11/2008 | Fukaya et al. | |
| 7,474,500 B2 | 1/2009 | Kim | |
| 7,529,062 B2 | 5/2009 | Xu | |
| 7,530,082 B2 | 5/2009 | Chang | |
| 7,570,453 B2 * | 8/2009 | Kim et al. | 360/99.18 |
| 7,602,586 B2 | 10/2009 | Kim et al. | |
| 7,751,145 B1 * | 7/2010 | Lin et al. | 360/97.17 |
| 7,839,602 B2 | 11/2010 | Dunckley et al. | |
| 7,961,426 B2 * | 6/2011 | Naruse | 360/99.2 |
| 8,009,384 B1 * | 8/2011 | Little | 360/97.14 |
| 8,089,733 B2 | 1/2012 | Ng et al. | |
| 8,164,848 B2 * | 4/2012 | Chan et al. | 360/97.2 |
| 8,194,346 B2 | 6/2012 | Kubo | |
| 8,228,631 B1 * | 7/2012 | Tsay et al. | 360/97.17 |
| 8,289,646 B1 * | 10/2012 | Heo et al. | 360/97.15 |
| 8,446,688 B1 | 5/2013 | Quines et al. | |
| 8,553,356 B1 | 10/2013 | Heo et al. | |
| 2001/0012174 A1 | 8/2001 | Imamura | |
| 2003/0151848 A1 | 8/2003 | Lee | |
| 2004/0085676 A1 | 5/2004 | Aoishi et al. | |
| 2005/0057854 A1 | 3/2005 | Khanna et al. | |
| 2005/0190488 A1 | 9/2005 | Chan et al. | |
| 2006/0005214 A1 | 1/2006 | Kim et al. | |
| 2006/0176608 A1 | 8/2006 | Xu et al. | |
| 2007/0081269 A1 | 4/2007 | Kim et al. | |
| 2010/0177442 A1 | 7/2010 | Ng et al. | |
| 2011/0255190 A1 | 10/2011 | Lee et al. | |
| 2011/0286131 A1 * | 11/2011 | Teo et al. | 360/224 |

FOREIGN PATENT DOCUMENTS

| | | |
|---|---|---|
| JP | 06236670 A | 8/1994 |
| JP | 08297817 A | 11/1996 |
| JP | 2000149493 A | 5/2000 |
| JP | 2000268485 A | 9/2000 |
| JP | 2003249053 A | 9/2003 |
| JP | 2003331562 A | 11/2003 |
| WO | WO 2004081942 A1 | 9/2004 |
| WO | WO 2007115453 A1 | 10/2007 |

* cited by examiner

DISK DEFLECTION DAMPER FOR DISK DRIVE

BACKGROUND

Disk drives are often used in electronic devices to record data onto or to reproduce data from a recording media, which can include one or more disks having recording surfaces. If the disk drive is subjected to a non-operational mechanical shock, such as when an electronic device is dropped, a disk inside the disk drive can deflect. Such disk deflection may be limited by contact between the disk and other components of the disk drive, such as the disk drive cover, ramp or base. Such contact may cause damage to the disk and result in a loss of data recorded on the disk.

In particular, non-operational mechanical shock may cause plastic deformation of a disk inside a disk drive when the disk contacts a non-uniform surface of the disk drive base. This problem is particularly a concern with aluminum disks, which have been used in the disk drive industry to replace more expensive glass disks. Furthermore, this problem is exacerbated in two respects when multiple disks are used in a disk drive. First, the extra weight of an additional disk increases the force with which a bottom disk impacts the base. Second, an additional disk may decrease the clearance available between the bottom disk and the base.

Electronic device manufacturer's specifications for mechanical shock robustness for disk drives are becoming more stringent, especially for disk drives used in mobile electronic devices. To meet such stringent specifications, a disk drive needs to survive more severe mechanical shocks. More severe mechanical shocks are more likely to cause impact between a disk and a base of the disk drive, despite a nominal clearance between the two. Moreover, the nominal clearance may not be practically increased to the extent necessary to prevent such impacts because of dimensional constraints of the disk drive or operational considerations.

BRIEF DESCRIPTION OF THE DRAWINGS

The features and advantages of the present embodiments of the present disclosure will become more apparent from the detailed description set forth below when taken in conjunction with the drawings. The drawings and the associated descriptions are provided to illustrate embodiments of the disclosure and not to limit the scope of the claimed invention. Reference numbers are reused throughout the drawings to indicate correspondence between referenced elements.

DETAILED DESCRIPTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 1:
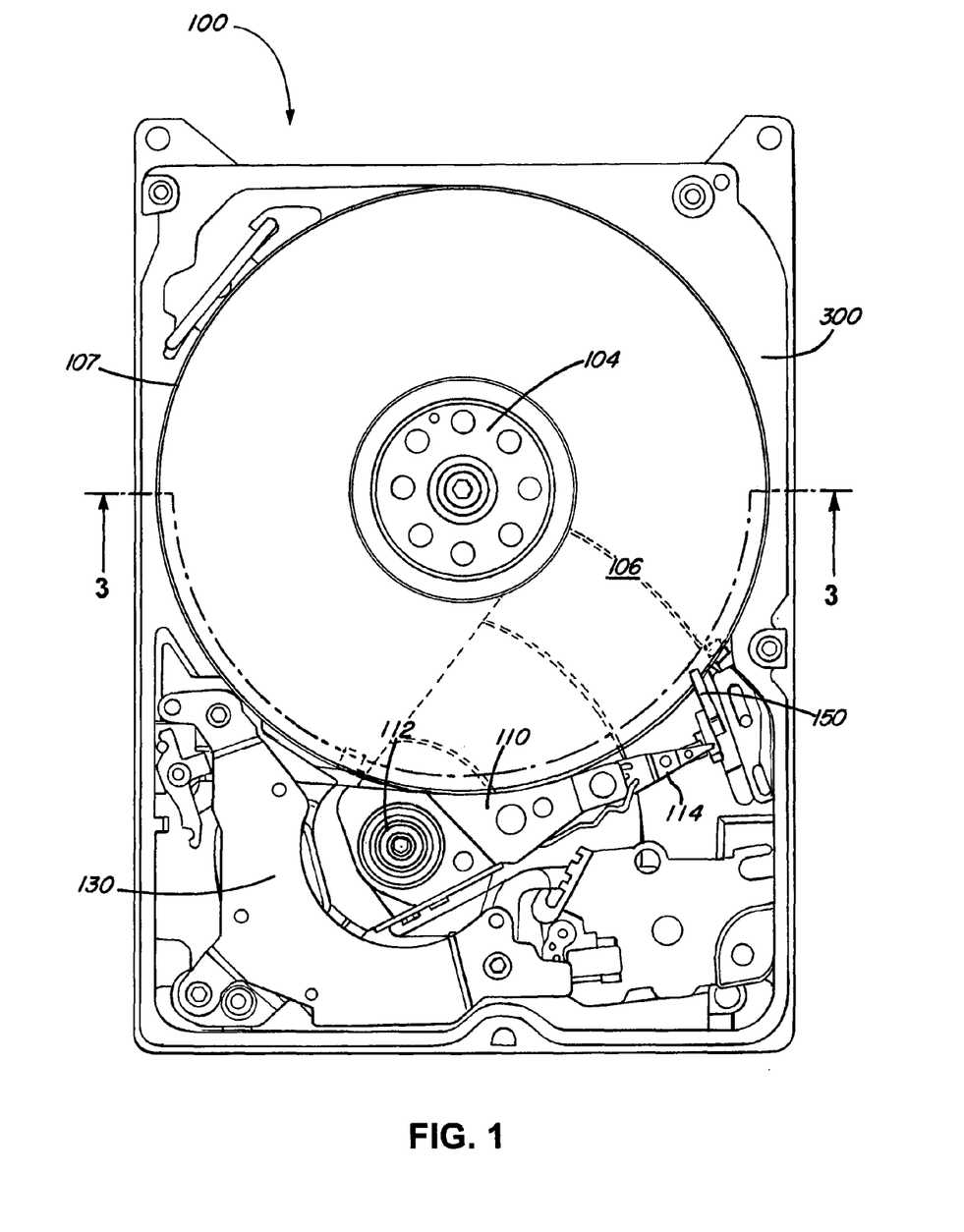
FIG. 1 depicts a top view of a disk drive according to an embodiment of the present invention.

FIG. 1 shows a top view of disk drive 100 according to an embodiment of the present invention. Disk 106 is mounted on spindle 104 and is rotated by spindle 104 during operation. Disk 106 includes outer diameter portion 107 which includes the outer edge of disk 106. In contemporary magnetic disk drive applications, disk 106 may comprise an aluminum, glass, or ceramic substrate, with the substrate being coated with a NiP under-layer, a thin-film magnetic layer, a diamond-like amorphous carbon protective layer, and a very thin lubricant layer.

In certain embodiments, disk drive 100 of FIG. 1 may include a plurality of disks that are mounted on spindle 104. For example, disk 106 may be a top disk below which one or more additional disks may be mounted on spindle 104.

Actuator 110 is affixed to base 300 and is typically fabricated from aluminum, magnesium, beryllium, or stainless steel. Actuator 110 pivots about pivot bearing ring 112, which is inserted as a cartridge into a bore in the actuator. Pivot bearing ring 112 is typically retained in the bore by a C-clip or tolerance ring but may be otherwise retained (e.g., by an adhesive). Actuator 110 is rotated about pivot bearing ring 112 by voice coil motor 130.

In the embodiment of FIG. 1, head gimbal assembly (HGA) 114 is attached to actuator 110 and may support read and write heads near its distal end. HGA 114 may also include a lift-tab at its distal end which is in contact with a parking surface of ramp 150 when disk drive 100 is in a non-operational state. Ramp 150 is affixed to base 300 and extends over a portion of outer diameter portion 107 of disk 106. In alternative embodiments, ramp 150 may be formed as part of base 300.

At the beginning of a period of non-operation of disk drive 100, actuator 110 swings HGA 114 away from spindle 104 and beyond outer diameter portion 107. The lift-tab of HGA 114 then contacts ramp 150 to separate or "unload" the read head from a top surface of disk 106. After such unloading, ramp 150 and its parking surface support the distal end of HGA 114, rather than disk 106 providing such support.

Ramp 150 may be fabricated from any suitable material having acceptable cost, dimensional stability, and tribological characteristics, although a material that can be injection molded is preferred. For example, ramp 150 may comprise polyoxymethylene (POM), polycarbonate, a liquid crystal polymer (LCP), nylon, an acetal resin plastic or acetyl homopolymer, and/or polyetherimide, among other materials.

Figure 2A:
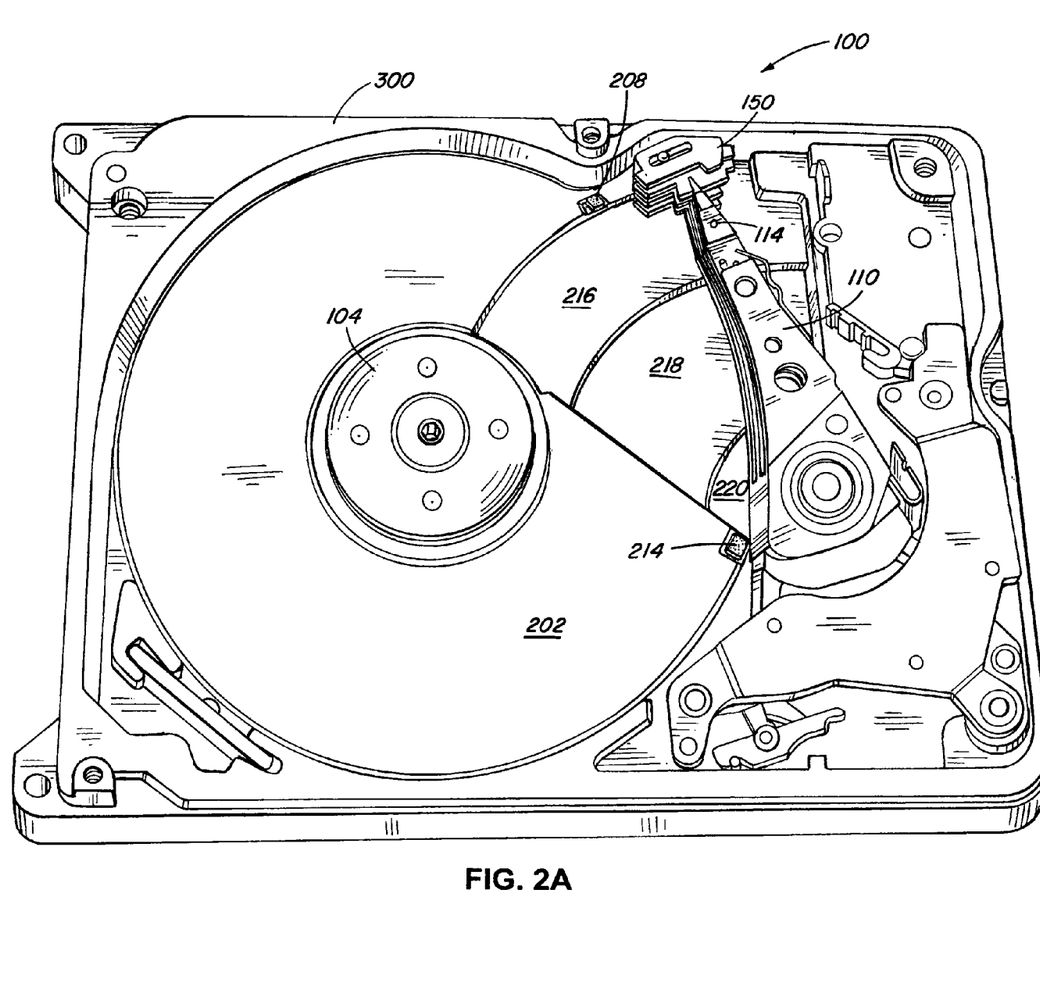
FIG. 2A depicts a top view of a disk drive showing features of its base according to an embodiment of the present invention.

FIG. 2A depicts a top view of disk drive 100 with disk 106 removed to illustrate features of base 300. As shown in FIG. 2A, base 300 includes first surface 202 which is located beneath disk 106 shown in FIG. 1. First surface 202 extends around spindle 104 with edges at base steps 216, 218 and 220, which provide clearance for movement of actuator 110 and HGA 114.

In the embodiment of FIG. 2A, disk drive 100 includes dampers 208 and 214, which are configured to contact a portion of the bottom surface of disk 106 when it is deflected toward first surface 202. Dampers 208 and 214 are made of a visco-elastic material, but may be made of any material soft enough to reduce damage to disk 106 and firm enough to reduce deflection of disk 106. For example, other materials chosen for dampers can include an elastomeric material or rubber.

Dampers 208 and 214 are positioned adjacent base steps 216 and 220 near ramp 150 and voice coil motor 130, respectively. In addition, dampers 208 and 214 are positioned beneath outer diameter portion 107 of disk 106 (shown in FIG. 1) such that dampers 208 and 214 are less likely to contact inner diameter portions of the bottom surface of disk 106 during disk deflection. Such inner diameter portions are more likely to contain user data. Accordingly, during a non-operational mechanical shock event, contact is preferred on an edge of disk 106 in outer diameter portion 107 since contact in this area is less likely to affect user data. The general locations for dampers 208 and 214 have also been identified as locations that often cause disk damage in conventional disk drives during a non-operational mechanical shock event. However, those of ordinary skill in the art will appreciate that other damper locations and quantities can be chosen without departing from the spirit and scope of the present invention.

Figure 2B:
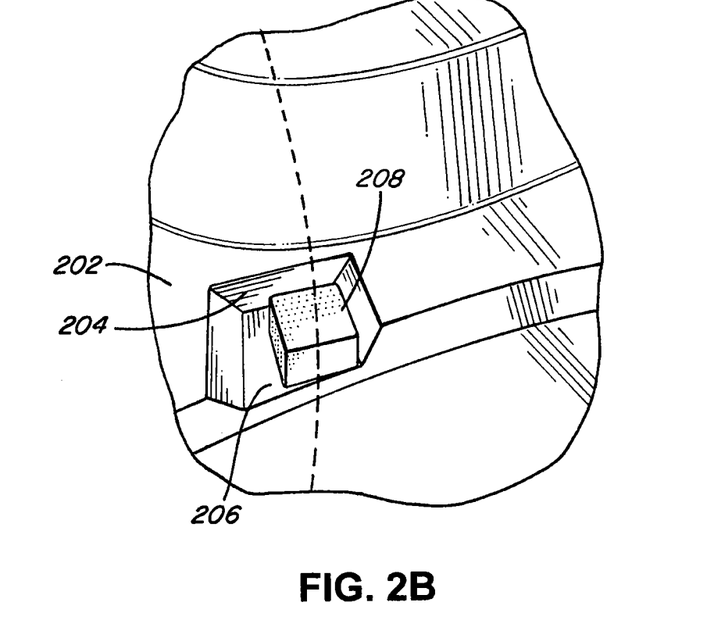
FIG. 2B depicts a close-up view of a first damper according to an embodiment of the present invention.
Figure 2C:
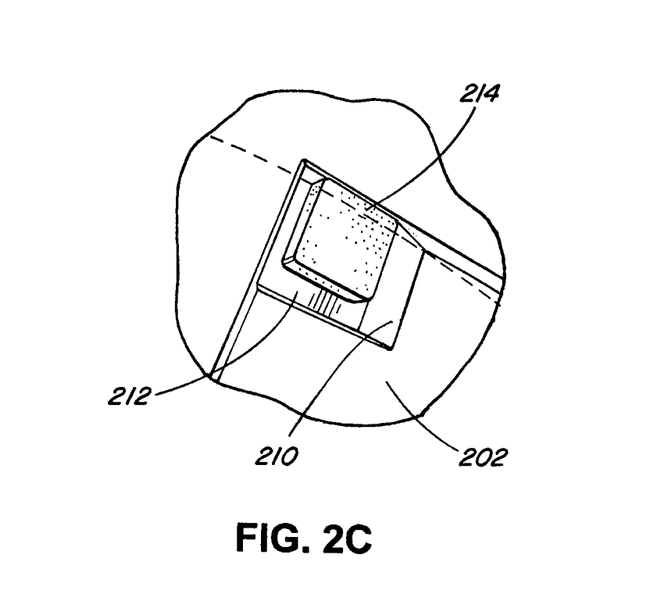
FIG. 2C depicts a close-up view of a second damper according to an embodiment of the present invention.

FIGS. 2B and 2C provide a more detailed view of dampers 208 and 214. The dashed lines in FIGS. 2B and 2C indicate the location of outer diameter portion 107 of disk 106. As shown in FIG. 2B, damper 208 is located on second surface 206 which is adjacent first surface 202. Chamfer 204 connects an edge of first surface 202 with an edge of second surface 206. Similarly, and as shown in FIG. 2C, damper 214 is located on third surface 212 which is adjacent first surface 202. Chamfer 210 connects an edge of first surface 202 with an edge of third surface 212.

In this embodiment, each of chamfers 204 and 210 are sloped at approximately a 30 degree angle from horizontal, thereby reducing the sharpness of an edge of first surface 202 beneath outer diameter portion 107. Damage to disk 106 is ordinarily reduced since outer diameter portion 107 does not contact a sharp corner of first surface 202 during disk deflection. In an alternative embodiment, the edge of the first surface can have a partial chamfer extending from the first surface. In yet another embodiment, the edge of the first surface can be rounded.

As shown in FIGS. 2B and 2C, dampers 208 and 214 have an approximately block-like shape, but other damper shapes can be chosen to absorb an impact force from disk 106, such as a trapezoidal shape or a semispherical shape.

Figure 3A:
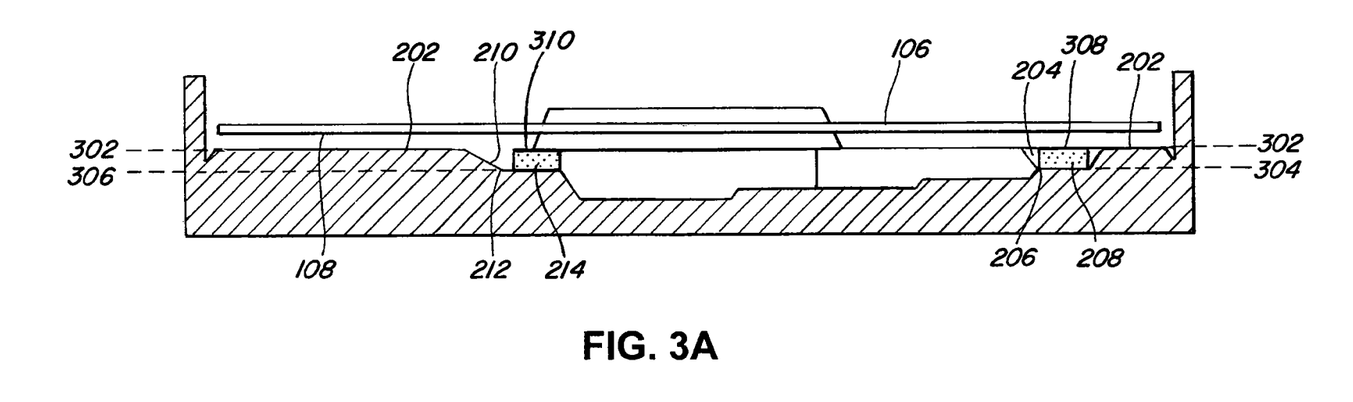
FIG. 3A illustrates a cross-sectional view of a disk drive according to an embodiment of the present invention.

FIG. 3A depicts a cross-sectional view of disk drive 100 along reference line 3 in FIG. 1. As shown in FIG. 3A, first surface 202 lies along plane 302 and second surface 206 lies along plane 304, which is positioned substantially parallel to plane 302. Second surface 206 is spaced apart from first surface 202 and is beneath at least a portion of bottom surface 108 of disk 106. Third surface 212 lies along plane 306, which is positioned substantially parallel to plane 302. As with second surface 206, third surface 212 is spaced apart from first surface 202 and is beneath at least a portion of bottom surface 108 of disk 106. In this example embodiment, second surface 206 and third surface 212 are at approximately the same height and have approximately the same surface area, however, the vertical locations and surface areas for surfaces supporting different dampers can differ or be the same.

Figure 3B:
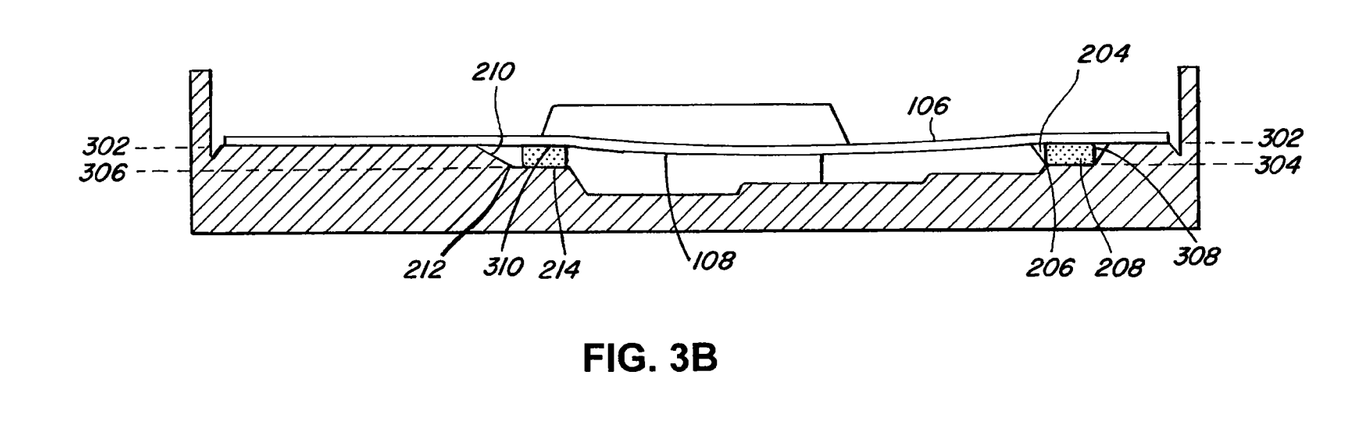
FIG. 3B illustrates a cross-sectional view of the disk drive of FIG. 3A during disk deflection.

In the embodiment of FIGS. 3A and 3B, the height of damper 208 is approximately equal to the distance between first surface 202 and second surface 206, such that top surface 308 of damper 208 is approximately level with first surface 202. Similarly, the height of damper 214 is approximately equal to the distance between first surface 202 and third surface 212, such that top surface 310 of damper 214 is approximately level with first surface 202.

One concern in choosing a damper height is to ensure that the damper does not contact the bottom surface of the disk during a relatively minor occurrence of non-operational mechanical shock that would not otherwise cause significant disk deformation. However, it will be appreciated by those of ordinary skill in the art that the heights of dampers may vary and that the top surfaces of dampers may not necessarily be level with any particular surface of the disk drive base.

FIG. 3B depicts a cross-sectional view of disk drive 100 along reference line 3 in FIG. 1 when disk drive 100 is subjected to a non-operational mechanical shock causing disk 106 to deflect toward first surface 202. As shown in FIG. 3B, bottom surface 108 contacts top surfaces 308 and 310 of dampers 208 and 214, respectively. Top surfaces 308 and 310 are constructed to facilitate contact with bottom surface 108 to allow dampers 208 and 214 to absorb impact forces and reduce the likelihood of permanent damage to disk 106.

Figure 4:
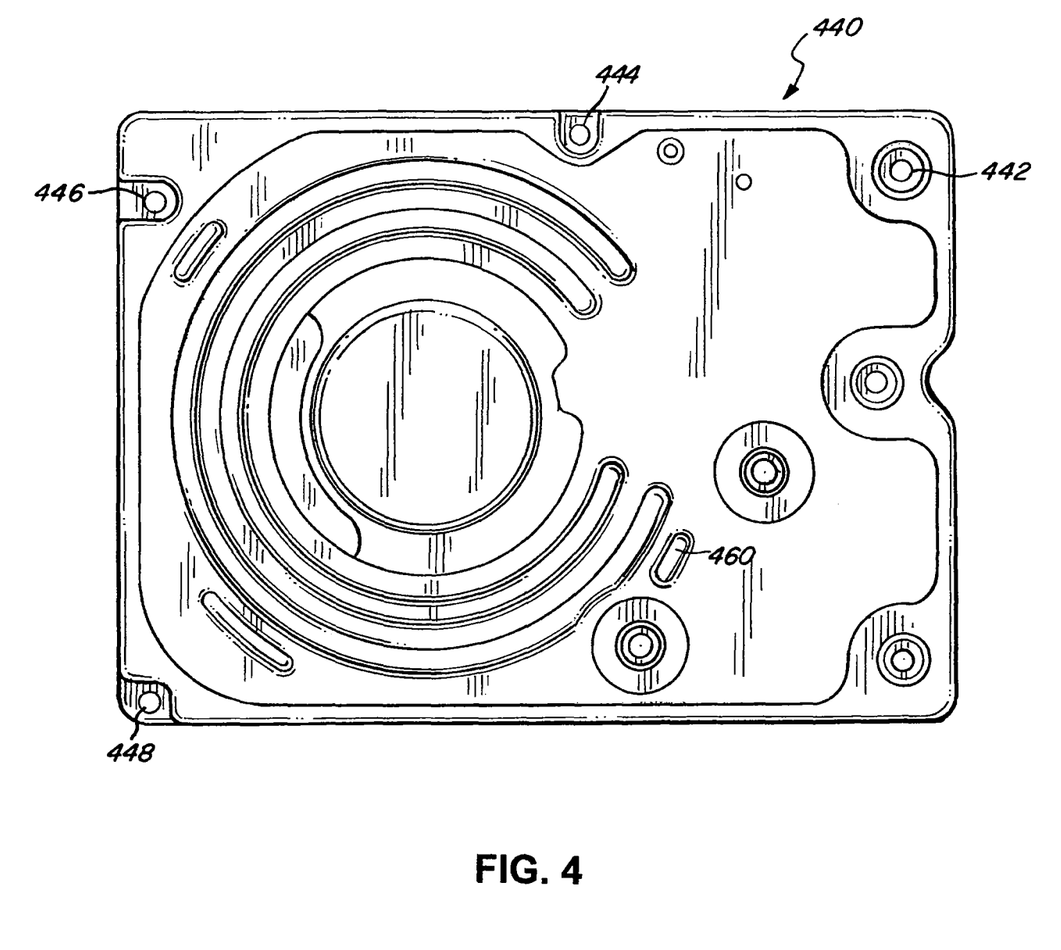
FIG. 4 depicts a bottom view of a disk drive cover in accordance with an embodiment of the present invention.

FIG. 4 depicts a bottom view of cover 440 which can be secured to base 300 using fasteners (not shown), such as screws, inserted through holes, such as holes 442, 444, 446 and 448. In alternative embodiments, cover 440 may be attached to base 300 using non-removable fasteners, such as rivets or an adhesive. When affixed to base 300, cover 440 is positioned over disk 106. Cover 440 may be made of a plastic material or a metal, such as stainless steel, aluminum or titanium.

In the embodiment of FIG. 4, cover 440 includes disk limiter 460 which protrudes from cover 440 toward disk 106 and is positioned on the bottom surface of cover 440 to contact an outer diameter portion of disk 106 when disk 106 deflects toward cover 440. Such upward deflection of disk 106 may occur during a non-operational mechanical shock event.

In this embodiment, disk limiter 460 is a form in place gasket. Alternatively, disk limiter 460 may be formed in cover 440 by a metal stamping process or may be molded as part of cover 440.

Figure 5:
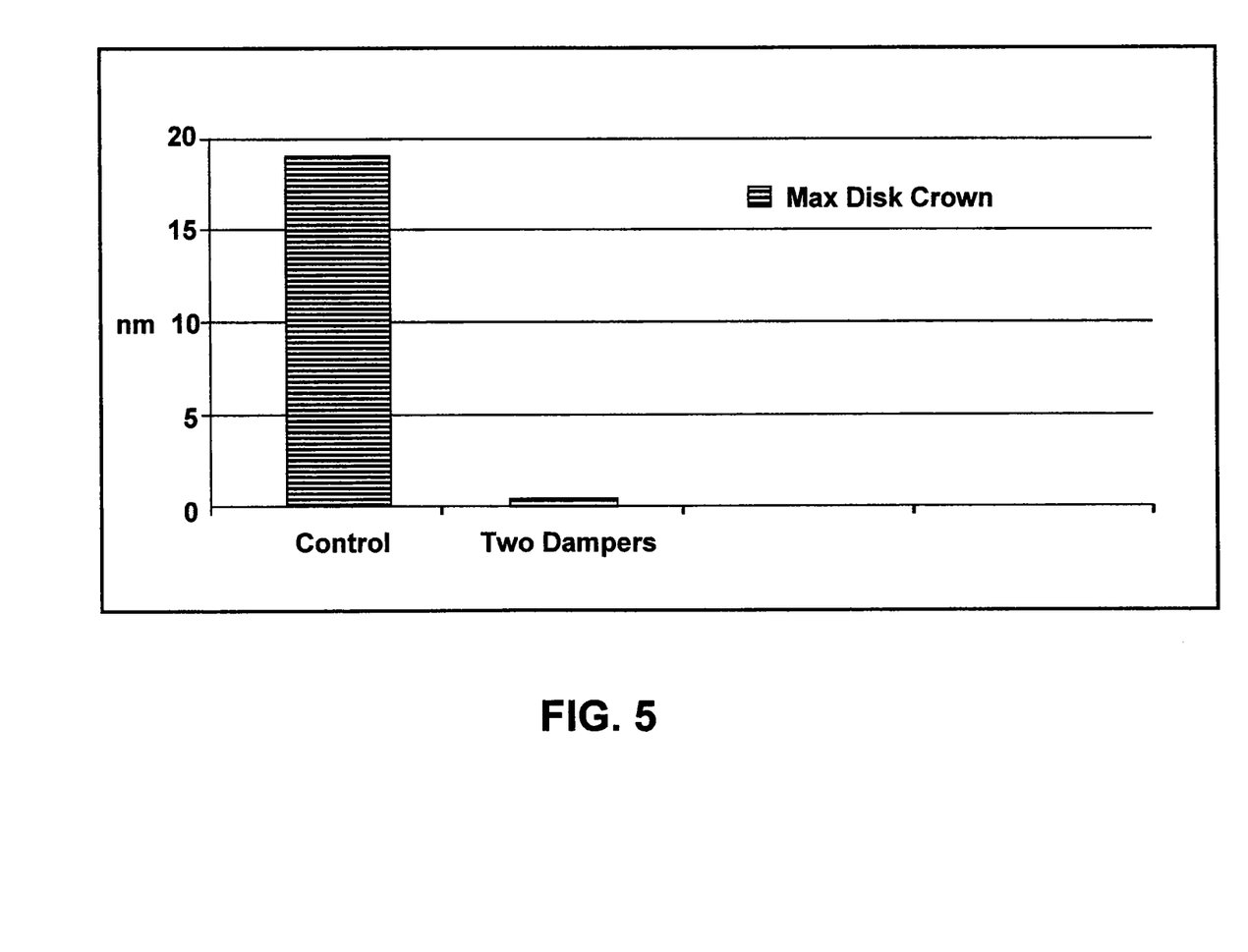
FIG. 5 shows test results of disk deformation for a disk drive according to an embodiment of the present invention.

FIG. 5 shows test results of disk deformation after a 1,000 G/1 ms non-operational mechanical shock. The bar graph of FIG. 5 compares a maximum deviation in disk surface heights for a conventional disk drive and a disk drive of the present invention. The maximum deviation in surface height is referred to as max disk crown, which is measured in nanometers. A large max disk crown is likely to result in errors during disk read or write processes. In this regard, an example of a specification for max disk crown can be less than 5 nm.

As shown in FIG. 5, the conventional disk drive labeled as "Control" has a max disk crown of 19 nm. In contrast, an embodiment of a disk drive of the present invention having two dampers has a significantly lower max disk crown of 0.37 nm.

The foregoing description of the disclosed example embodiments is provided to enable any person of ordinary skill in the art to make or use the present invention. Various modifications to these examples will be readily apparent to those skilled in the art, and the principles defined herein may be applied to other examples without departing from the spirit or scope of the present invention. The described embodiments are to be considered in all respects only as illustrative and not restrictive and the scope of the invention is, therefore, indicated by the following claims rather than by the foregoing description. All changes which come within the meaning and range of equivalency of the claims are to be embraced within their scope.

What is claimed is:

1. A disk drive comprising:
    a disk having a bottom surface;
    a head gimbal assembly (HGA);
    an actuator to move the HGA in relation to the disk;
    a base comprising:
        a first surface lying along a first plane;
        a first base step and a second base step adjacent the first surface for allowing clearance for movement of the actuator or the HGA;
        a second surface lying along a second plane positioned substantially parallel to the first plane, the second surface being adjacent to both the first surface and the first base step and spaced apart from the first surface between the first surface and the first base step, wherein the second surface is located beneath at least a portion of the bottom surface of the disk; and
        a third surface lying along a third plane positioned substantially parallel to the first plane, the third surface being adjacent to both the first surface and the second base step and spaced apart from the first surface between the first surface and the second base step, wherein the third surface is located beneath at least a portion of the bottom surface of the disk; and
    wherein the disk drive further comprises:
    a first damper located on the second surface and configured to contact a portion of the bottom surface of the disk when the disk is deflected toward the first surface so as to reduce deformation of the disk; and
    a second damper located on the third surface and configured to contact a portion of the bottom surface of the disk when the disk is deflected toward the first surface so as to reduce deformation of the disk.

2. The disk drive of claim 1, further comprising:
    a ramp affixed to the base; and
    a voice coil motor affixed to the base;
    wherein the first damper is located near the ramp and the second damper is located near the voice coil motor.

3. The disk drive of claim 1, wherein the first damper and the second damper are located beneath an outer diameter portion of the disk.

4. The disk drive of claim 1, wherein a first chamfer is provided on a first edge of the first surface near the first damper and a second chamfer is provided on a second edge of the first surface near the second damper.

5. The disk drive of claim 4, wherein the first chamfer connects the first edge of the first surface with an edge of the second surface and the second chamfer connects the second edge of the first surface with an edge of the third surface.

6. The disk drive of claim 1, further comprising a top cover affixed to the base, and wherein a disk limiter protrudes from the top cover toward the disk.

7. The disk drive of claim 6, further comprising a voice coil motor affixed to the base, and wherein the disk limiter is a form-in-place gasket located near the voice coil motor.

8. The disk drive of claim 1, wherein a first distance between the first surface and the second surface is approximately equal to a height of the first damper and a second distance between the first surface and the third surface is approximately equal to a height of the second damper.

* * * * *